United States Patent [19]

Hirohama et al.

[11] Patent Number: 4,922,570
[45] Date of Patent: May 8, 1990

[54] VEHICULAR WINDSHIELD WASHER SYSTEM

[75] Inventors: Yuji Hirohama, Yokohama; Eiichi Ono, Atsugi; Yukiho Murata, Sagamihara, all of Japan

[73] Assignees: Nissan Motor Co., Ltd.; Jidosha Denki Kogyo Kabushiki Kaisha, both of Yokohama, Japan

[21] Appl. No.: 215,842

[22] Filed: Jul. 6, 1988

[30] Foreign Application Priority Data

Jul. 8, 1987 [JP] Japan .................. 62-104964[U]

[51] Int. Cl.⁵ ............................................. B60S 1/52
[52] U.S. Cl. ............................. 15/250.02; 15/250.04
[58] Field of Search ................. 15/250.01–250.04; 239/284.1

[56] References Cited

FOREIGN PATENT DOCUMENTS

| | | | |
|---|---|---|---|
| 2216752 | 10/1973 | Fed. Rep. of Germany | 15/250.04 |
| 2344724 | 3/1975 | Fed. Rep. of Germany | 15/250.04 |
| 48-12727 | 2/1973 | Japan . | |
| 48-62732 | 8/1973 | Japan . | |
| 62-24171 | 2/1987 | Japan . | |
| 62-24172 | 2/1987 | Japan . | |
| 62-32270 | 2/1987 | Japan . | |

Primary Examiner—Harvey C. Hornsby
Assistant Examiner—M. Spisich
Attorney, Agent, or Firm—Foley & Lardner, Schwartz, Jeffery, Schwaab, Mack, Blumenthal & Evans

[57] ABSTRACT

A vehicular windshield washer system in combination with a windshield wiper having a wiper arm. The washer system is comprised of a pair of washer nozzles mounted on the wiper arm and so directed to eject washer fluid to opposite sides of the wiper arm upon being supplied with washer fluid. The washer fluid from a washer fluid source is selectively supplied to the washer nozzles in accordance with movement of the wiper arm. The washer fluid is suppliable to one of the washer nozzles upon rotational movement of the wiper arm in one direction and to the other washer nozzle upon rotational movement of the wiper arm in the other direction. The rotational movements turn at a turning position of the wiper arm. Additionally, the washer fluid is supplied to the one washer nozzle until the wiper arm reaches a position slightly forward of the turning position and stopped to be supplied to the same washer nozzle for a duration of rotational movement of the wiper arm from the slightly forward position to the turning position, thereby saving washer fluid and preventing washer fluid from scattering sideward of a vehicle body.

9 Claims, 10 Drawing Sheets

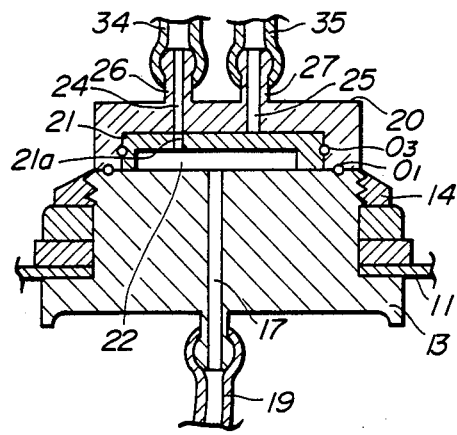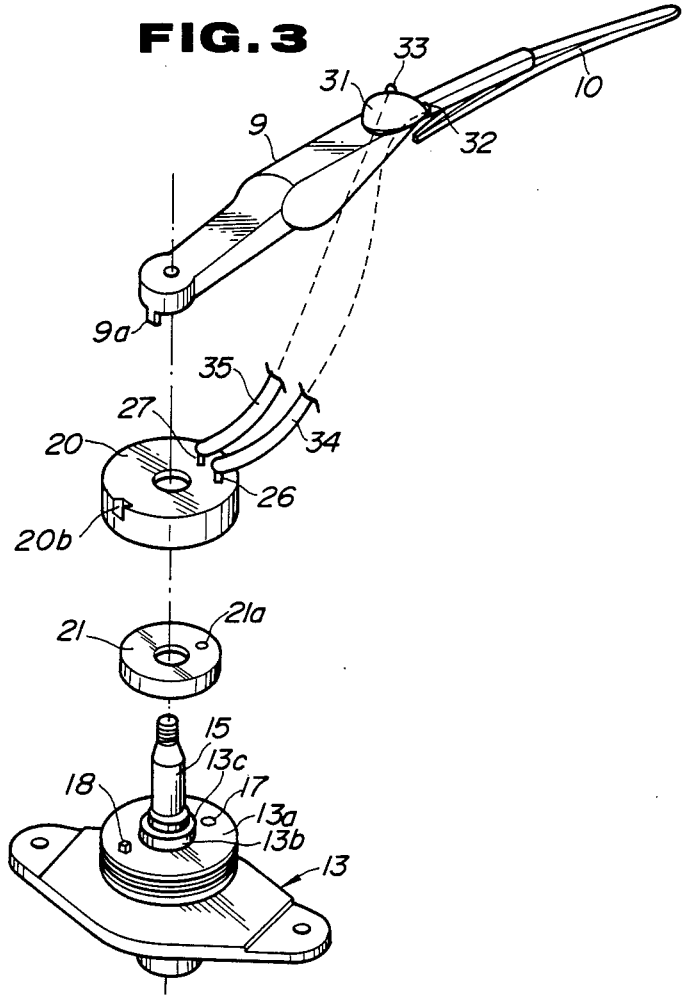

VEHICULAR WINDSHIELD WASHER SYSTEM

BACKGROUND OF THE INVENTION

1. Field of the Invention

This invention relates generally to a vehicular windshield washer system in combination with a windshield wiper, and more particularly to improvements in the vehicular windshield washer system including two washer nozzles mounted on a wiper arm of the windshield wiper, arranged such that washer fluid ejection from the two washer nozzles is changed in accordance with swinging movement of the wiper arm.

2. Description of the Prior Art

A variety of vehicular windshield washer systems in combination with windshield wipers have been proposed and put into practical use in which two washer fluid nozzles are mounted on each wiper arm to alternately eject washer fluid onto a windshield on o the opposite sides of the wiper arm in accordance with the swinging movement of the Wiper arm. An example of such conventional vehicular windshield washer systems will be discussed with reference to FIGS. 23 and 24. In this windshield washer system, two washer nozzles 3, 4 are installed on a nozzle installation member 2 mounted on a wiper arm 1 to spray washer fluid from one of the washer nozzles 3, 4 onto a windshield 7' in response to the direction of rotational movement of the wiper arm during swinging operation of the wiper arm. Such a vehicle windshield washer system is disclosed, for example, in Japanese Utility Model Provisional Publication Nos. 48-62732 and 48-12727).

In such an arrangement, a change-over valve or the like for changing washer fluid supply is provided to accomplish ejection of washer fluid from one of the nozzles 3, 4 directed to the rotational or advancing direction of the wiper arm. A valve serving as such a change-over valve is disclosed, for example, in Japanese Utility Model Provisional Publication Nos. 62-32270, 62-24171, and 62-24172.

With such a change-over valve, changing washer fluid supply from one to the other nozzle is carried out at turning positions A, B at which the rotational movement direction of the wiper arm is changed over, and therefore washer fluid is continuously ejected in the rotational direction of the wiper arm until the wiper arm reaches the turning position A, B.

Such washer fluid ejection wastes washer fluid. Because wiping of the windshield 7' with washer fluid can be sufficiently accomplished even by supplying washer fluid to the nozzle until the wiper arm reaches a position slightly forward of the turning position A, B. Furthermore, according to the above conventional washer fluid ejection, when the wiper arm 1 rotationally moves towards the side of a front pillar 6 near a driver's seat, washer liquid is scattered sideward over the front pillar 6, thereby troubling pedestrains.

SUMMARY OF THE INVENTION

It is an object of the present invention to provide an improved vehicular windshield washer system which can contribute to saving washer fluid and can prevent washer fluid from scattering sideward over a front pillar of a vehicle at a time of moving direction turning of a wiper arm moving in a direction toward the side of the front pillar.

According to the present invention, the vehicular windshield washer system which is used in combination with a windshield wiper is comprised of first and second washer nozzles mounted on a wiper arm of the wiper. The first and second washer nozzles are directed as to eject washer fluid to the opposite sides of the wiper arm upon being supplied with washer fluid. The washer fluid from a washer fluid source is selectively suppliable to the first and second washer nozzles in accordance with the movement of the wiper arm. More specifically, washer fluid is suppliable to the first washer nozzle upon the first rotational movement of the wiper arm and to the second washer nozzle upon the second rotational movement of the wiper arm in a second direction. The first and second rotational movements turn at a turning position of the wiper arm. Additionally, washer fluid is suppliable to the first washer nozzle until the wiper arm reaches another position (slightly forward of the turning position) spaced from the turning position and stoppable to the first washer nozzle for a duration of rotational movement of the wiper arm from said another position to the turning position.

Accordingly, the spraying of washer fluid from the washer nozzle is carried out until the wiper arm reaches the position slightly forward of the turning position of the wiper arm. However, washer fluid spraying is stopped for a duration the wiper arm moves from the above-mentioned slightly forward position to the turning position of the wiper arm.

Thus, after the wiper arm moves to the turning position over the above-mentioned slightly forward position, wiping of the windshield can be effectively accomplished with the washer fluid ejected immediately before, thereby saving washer fluid and preventing washer fluid from scaterring sideward of the front pillar of the vehicle.

BRIEF DESCRIPTION OF THE DRAWINGS

In the drawings, like reference numerals and characters designate like elements and parts throughout all the figures, in which:

FIG. 2 is a fragmentary sectional view taken in the direction of arrows substantially along the line II—II of FIG. 1;

FIG. 3 is an exploded perspective view of the essential part of the vehicular windshield washer system of FIG. 1;

DETAILED DESCRIPTION OF THE INVENTION

Figure 1:
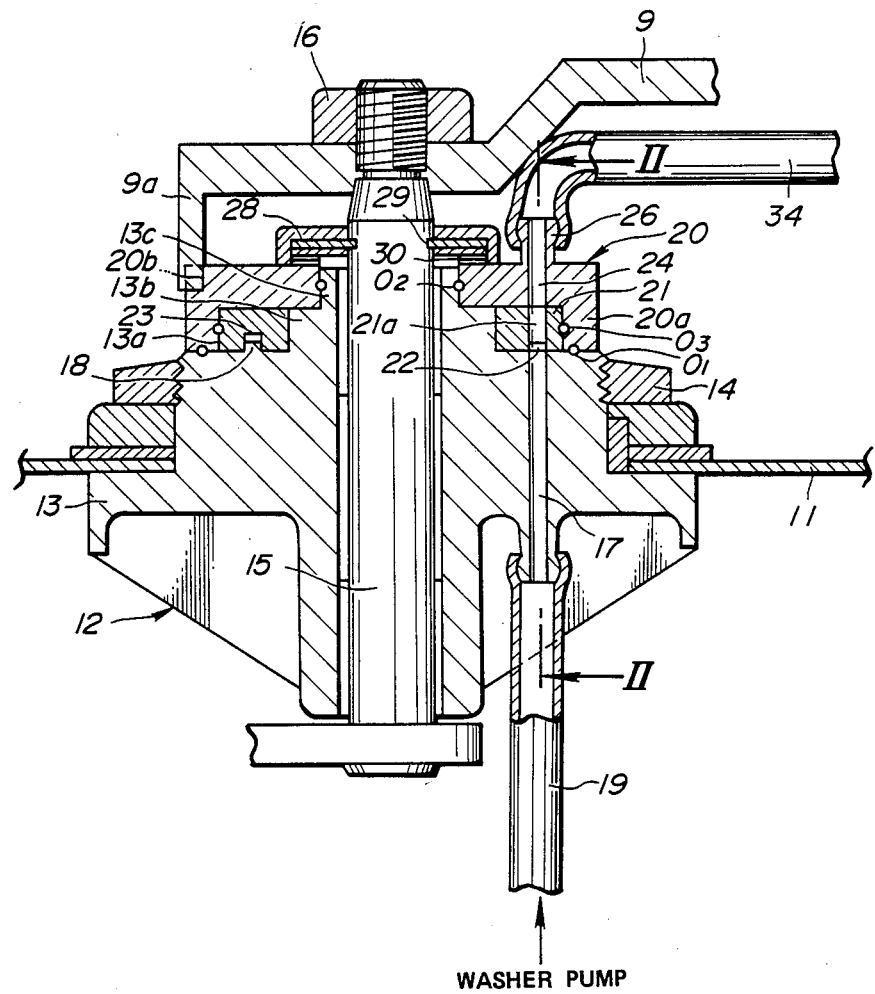
FIG. 1 is a vertical sectional view of an essential part of a first embodiment vehicular windshield washer system in accordance with the present invention.
Figure 4:
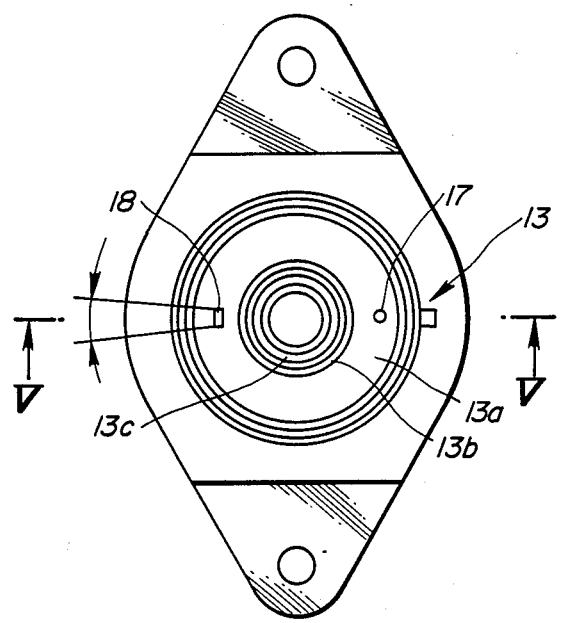
FIG. 4 is a plan view of a pivot block of the vehicular windshield washer system of FIG. 1.
Figure 5:
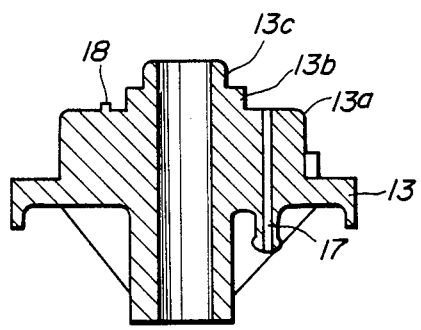
FIG. 5 is a sectional view taken in the direction of arrows substantially along the line V—V of FIG. 4.
Figure 6:
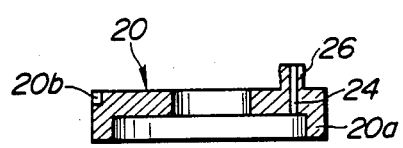
FIG. 6 is a vertical sectional view of a rotatable disc member of the vehicular windshield washer system of FIG. 1.
Figure 7:
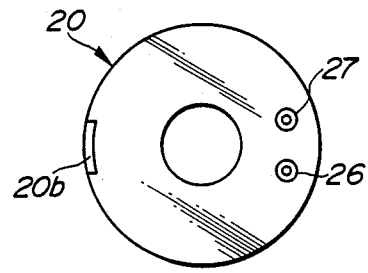
FIG. 7 is a plan view of the rotatable disc member of FIG. 6.
Figure 8A:
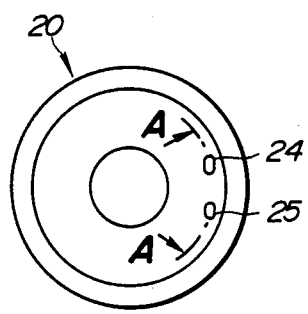
FIG. 8A is a bottom plan view of the rotatable disc member of FIG. 7.
Figure 8B:
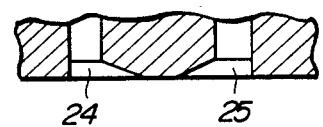
FIG. 8B is a fragmentary sectional view taken in the direction of arrows substantially along the line A—A of FIG. 8A.
Figure 9:
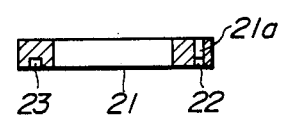
FIG. 9 is a vertical sectional view of an annular valve member of the vehicular windshield washer system of FIG. 1.
Figure 10:
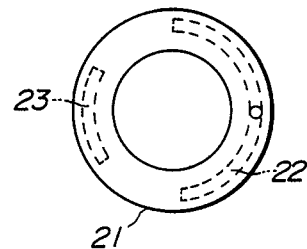
FIG. 10 is a plan view of the annular valve member of FIG. 9.
Figure 11:
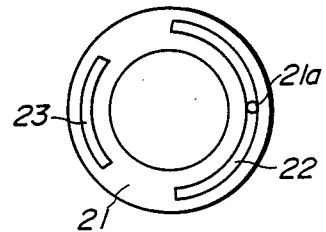
FIG. 11 is a bottom plan view of the annular valve member of FIG. 9.

Referring now to FIGS. 1 to 16, there is shown a first embodiment of a vehicular windshield (front glass) washer system in combination with a wiper system, in accordance with the present invention. FIG. 16 shows a state in which right and left side surfaces of a windshield 7 of an automotive vehicle are being wiped respectively by windshield wipers 8, 8 each of which forms part of the wiper system of the present invention. Each wiper 8 includes a wiper arm 9 which is provided at its free end with a wiper blade 10.

As shown in FIG. 1, the base section of the wiper arm 9 is movably supported through a pivotting device 12 to a part of a cowl top 11 forming part of a vehicle body outer panel. The pivotting device 12 includes a generally cylindrical pivot block 13 which pierces the cowl top 11 and is provided with a flange (no numeral) fitted to the cowl top 11. The pivot block 13 is fixed through intervening members (no numerals) to the cowl top 11 by means of a ring nut engaged with an annular threaded section (no numeral) of the pivot block 13 in such a manner that the intervening members and the cowl top 11 are tightly put between the nut 14 and the pivot block flange. A pivot shaft 15 axially pierces the pivot block 13 in such a manner as to be rotatably supported by the pivot block 13. The base section of the wiper arm 9 is fixed to the pivot shaft 15 by means of a nut 16. The wiper arm 9 is provided with an engagement projection 9a.

The pivot block 13 is integrally formed at its top section with a middle diameter cylindrical section 13b which is coaxial with the pivot shaft 15. A small diameter cylindrical section 13c is integrally formed on the middle diameter cylindrical section 13b which is also coaxial with the pivot shaft 15. The middle diameter cylindrical section 13b has a diameter smaller than the main body of the pivot block 13 and larger than the small diameter cylindrical section 13c. Additionally, the pivot block 13 is formed at its top surface with a seat surface 13a located radially outward of the middle diameter cylindrical section 13b. The pivot block 13 is formed with a washer liquid supply passage 17 which vertically extends and opens to the seat surface 13a. The lower end of the liquid supply passage 17 is connected to a hose 19 which is in turn connected to an outlet opening of a washer pump (not shown) for discharging washer liquid under pressure. Additionally an engagement projection 18 is formed on the seat surface 13a.

A rotatable disc member 20 is fitted around the small diameter cylindrical section 13c and formed with a peripheral cylindrical section 20a whose lower surface is in movable contact with the seat surface 13a. The rotatable disc member 20 is rotatable relative to the pivot block 13. An annular valve member 21 is fitted between the rotatable disc member cylindrical section 20a and the pivot block middle diameter cylindrical section 13b. An O-ring $O_1$ is interposed between the lower surface of the rotatable disc member cylindrical section 20a and the pivot block seat surface 13a. An O-ring $O_2$ is interposed between the inner peripheral surface of the rotatable disc member 20 and the periphery of the pivot block small diameter section 13c. Accordingly, a fluid-tight seal is maintained between the pivot block 13 and the rotatable disc member 20. An O-ring $O_3$ is interposed between the peripheral surface of the annular valve member 21 and the inner peripheral surface of the rotatable disc member cylindrical section 20a, thereby establishing a frictional engagement between the rotatable disc member 20 and the annular valve member 23. The rotatable disc member 20 is formed with an engagement cutout 20b (See FIGS. 1, 3 and 4) with which the engagement projection 9a of the wiper arm 9 is engaged, so that the rotatable disc member 20 can rotate around the pivot shaft 15 together with the wiper arm 9.

As shown in FIGS. 1, 2, and 9 to 11, the annular valve member 21 is formed at its lower surface with longer and shorter arcuate grooves 22, 23 which extend coaxial with the pivot shaft 15. The annular valve member 21 is formed with a vertically extending valve opening 21a whose upper end opens to the upper surface of the annular valve member 21 while lower end opens to the longitudinal center of the longer arcuate groove 22. As shown in FIGS. 1, 2, 8A and 8B, the rotatable disc member 20 is formed with first and second changeover passages 24, 25 which extend respectively through nipples 26, 27 projecting upwardly from the upper surface of the rotatable disc member 20.

Turning to FIG. 1, a stopper ring 28 such as a circlip is installed near the upper end of the pivot shaft 15. A washer 29 and a wave washer 30 are interposed between the stopper ring 28 and the rotatable disc member 20, so that the rotatable disc member 20 is springingly biased downwardly under the action of the wave washer 30.

As shown in FIG. 3, the wiper arm 9 is provided with a nozzle installation plate 31 to which first and second washer nozzles 32, 33 are fixedly installed. The first and second washer nozzles 32, 33 are fluidly connected with the changeover passages 26 and 27 through hoses 34 and 35, respectively. In this embodiment, each washer nozzle 32, 33 is adapted to make it possible to spray washer fluid onto the windshield at a position of about 30 mm backward of the wiper blade 10 on the right or left side of the wiper blade 10.

The manner of operation of the first embodiment vehicular windshield washer system will be discussed hereinafter along with other set conditions.

Rotating output of the wiper motor (not shown) is transmitted through a link mechanism (not shown) to the pivot shaft 15 so that the wiper arm 9 swings alternately to the right and left thereby wiping the outer surface of the windshield 7. During such operation, the rotatable disc member 20 rotates or swings together with the wiper arm 9 in one (right) direction or in the opposite (reverse) direction, in which the annular valve member 21 is rotatable together with the rotatable disc member 20 under the friction therebetween.

Figure 15:
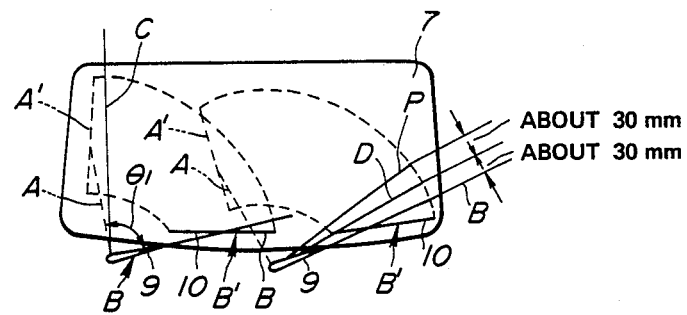
FIG. 15 is an explanatory view of locational relationship between a windshield and wipers in combination with the vehicular windshield washer system of FIGS. 1 to 3, illustrating the operation of the system.
Figure 16:
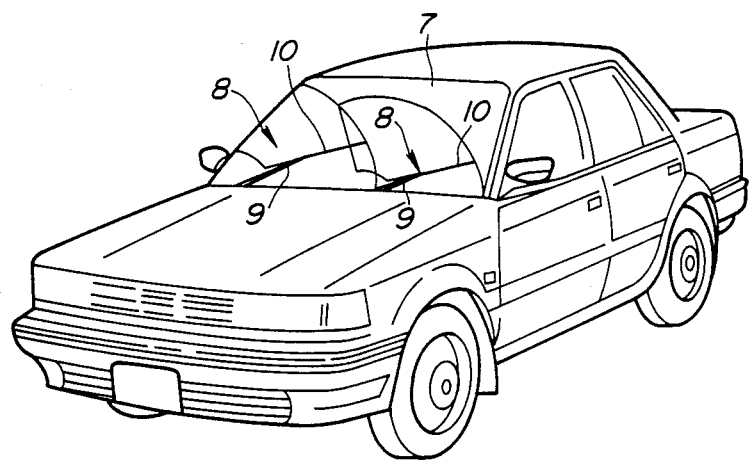
FIG. 16 is a perspective view of an automotive vehicle equipped with the vehicular windshield washer system shown in FIGS. 1 to 3.
Figure 17:
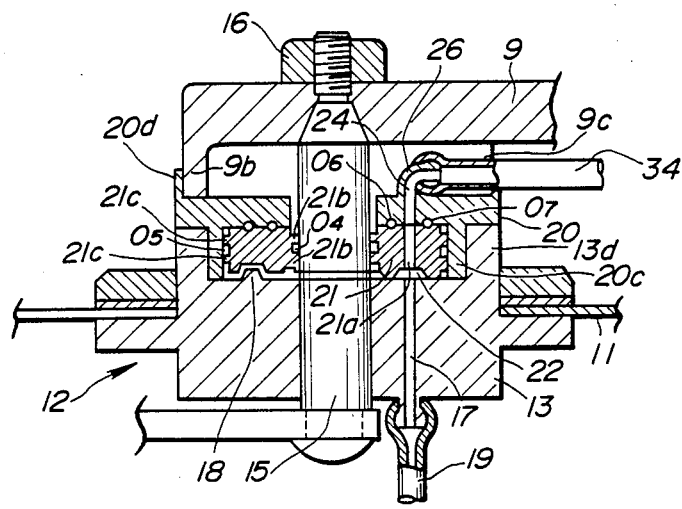
FIG. 17 is a fragmentary vertical sectional view of an essential part of a second embodiment of the vehicular windshield washer system in accordance with the present invention.
Figure 18:
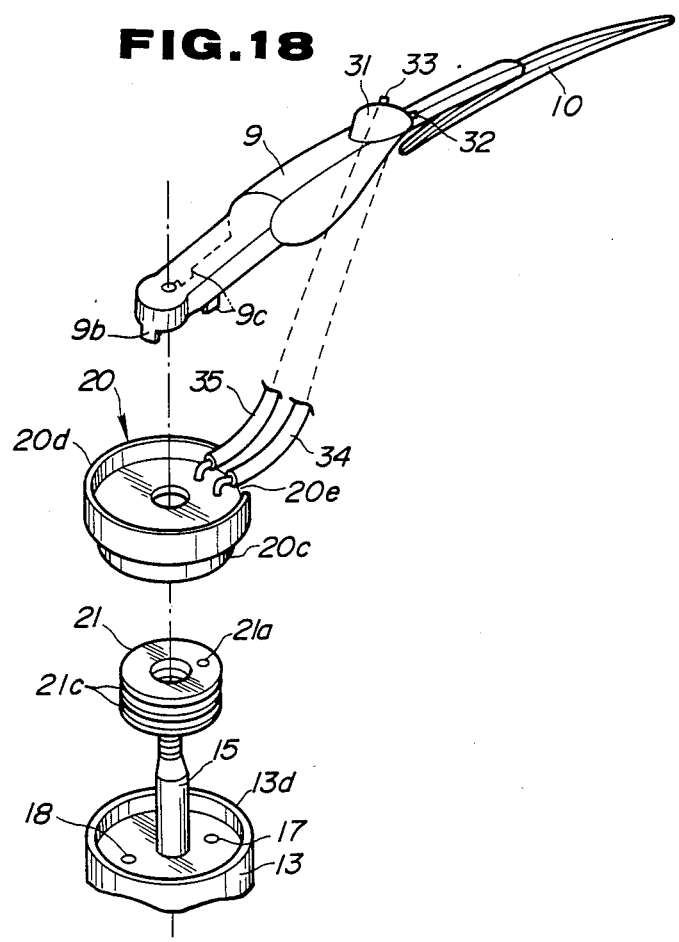
FIG. 18 is an exploded perspective view of the essential part of the vehicular windshield washer system of FIG. 1.
Figure 19:
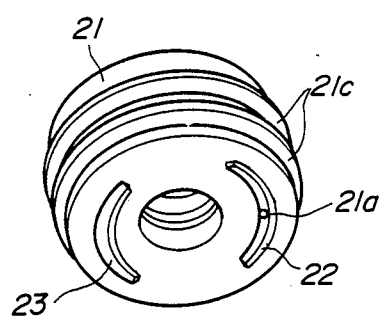
FIG. 19 is a perspective view of the annular valve member of the vehicular windshield washer system of FIG. 1 as viewed from the side of the bottom of the system.
Figure 20:
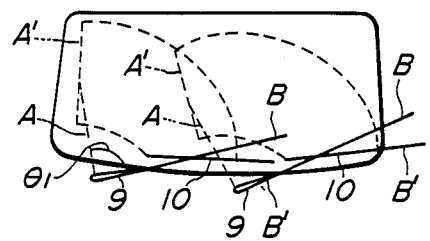
FIG. 20 is a view showing the locational relationship between the windshield and the wipers, illustrating the operation of the vehicular windshield washer system shown in FIG. 17.
Figure 21:
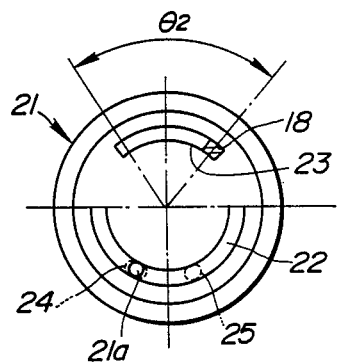
FIGS. 21 and 22 are views showing the locational relationship between the annular valve member and the rotatable disc member of the vehicular windshield washer system of FIG. 17 as viewed from the direction of the bottom side of the system.
Figure 22:
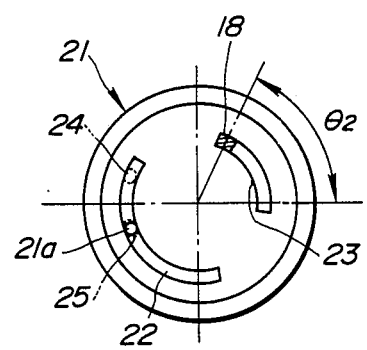
Figure 23:
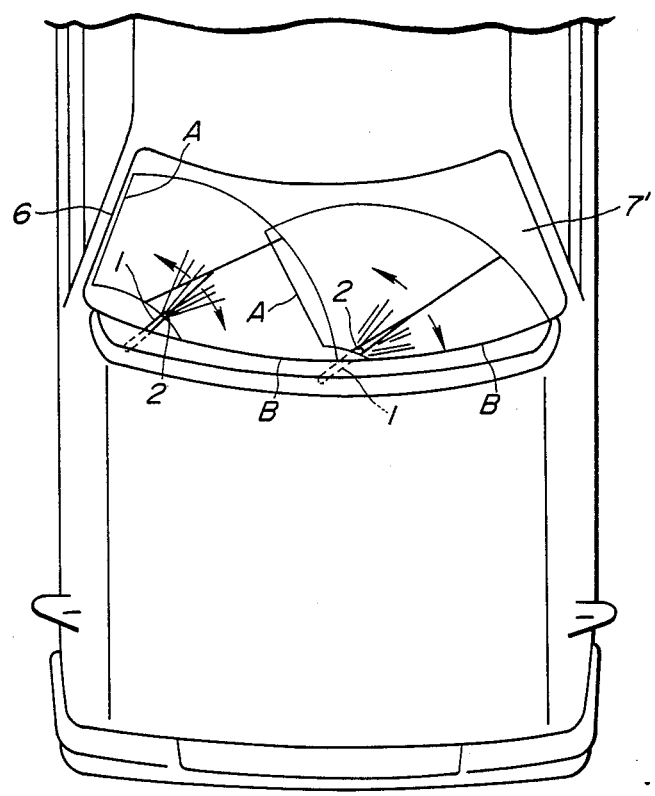
FIG. 23 is a fragmentary plan view of an automotive vehicle equipped with a conventional vehicular windshield washer system in combination with wipers.
Figure 24:
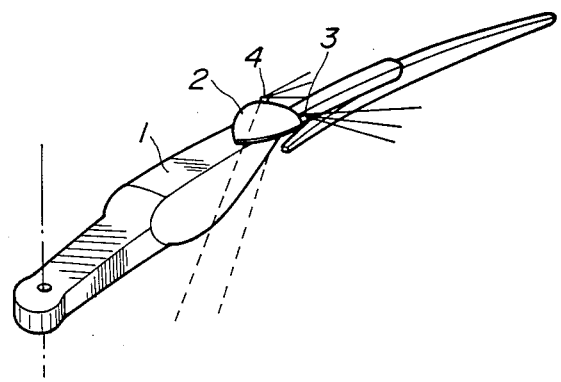
FIG. 24 is a perspective view of one of the wipers of the system of FIG. 23.

Here, referring to FIG. 15 in which swing direction changing ends or turning positions of the swinging wiper arm 9 are indicated respectively by the characters A and B, the swinging wiper blade 10 turns at its turning positions indicated respectively by the characters A' and B'. Additionally, the operational angle $\theta_1$ of the wiper arm 9 is set larger than the operational angle $\theta_2$ (in FIG. 12A) of the annular valve member 21 or an angle formed by the arcuate groove 23 with respect to the axis of the pivot shaft 15.

Figure 12A:
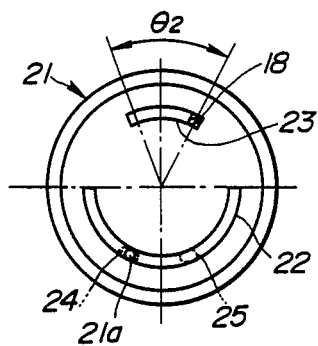
FIGS. 12A, 12B, 12C and 12D are views showing the locational relationships between the annular valve member and the rotatable disc member of the vehicular windshield washer system of FIGS. 1 to 3 as viewed from the direction of the axis of a pivot shaft, illustrating the operation of the vehicular windshield washer system.
Figure 12B:
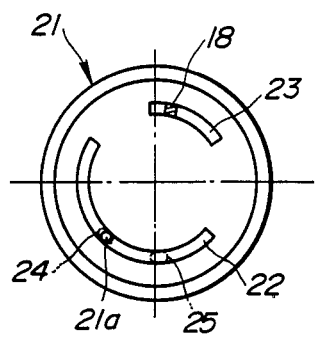
Figure 12C:
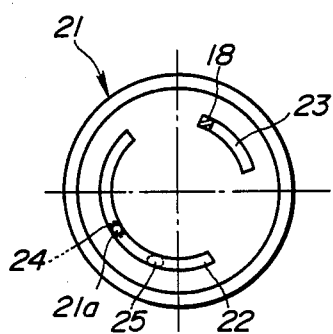
Figure 12D:
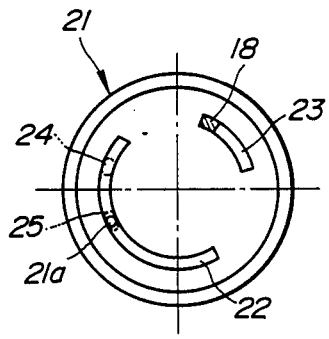
Figure 13:
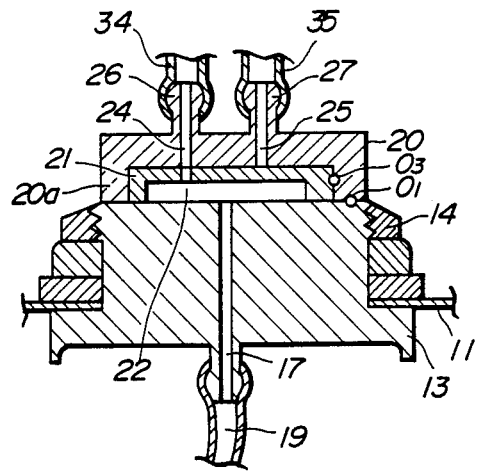
FIGS. 13 and 14 show sectional views similar to FIG. 2 but illustrating the operation of the vehicular windshield washer system shown in FIGS. 1 to 3.
Figure 14:
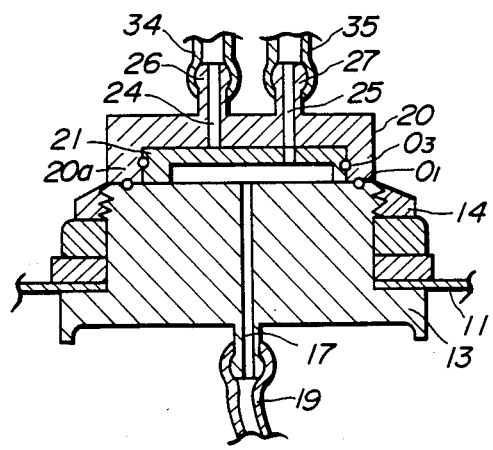

Accordingly, when wiper arm 9 rotationally moves clockwise from the turning position A in FIG. 15 during the above-mentioned swinging movement of the wiper arm 9, the rotatable disc member 20 also rotates clockwise from the state of FIG. 12A to the states of FIGS. 12B, 12C and 12D in the order named. When the wiper arm 9 reaches a position P (about 60 mm forward of the turning position B) slightly rearward of the turning position B, one end of the arcuate groove 23 is brought into engagement with the engagement projection 18 as shown in FIG. 12C, so that the rotation of the annular valve member 21 under friction is stopped. Thereafter, the wiper arm 9 further rotates toward the turning position B (near the lower edge of the windshield 7 in FIG. 15), and therefore the rotatable disc member 20 further rotates together with the wiper arm 9. This interrupts fluid communication between the changeover passage 24 and the valve opening 21a, thereby stopping the supply of washer fluid to the nozzle 32. Thus, the spraying of washer fluid from the nozzle 32 onto the windshield 7 is carried out until the wiper arm 9 reaches the position P (about 60 mm forward of the turning position B) so that the washer fluid reaches a portion of the windshield of about 30 mm forward of the turning position B. In this state, fluid communication between the changeover passage 25 and the valve opening 21a is interrupted, and therefore supply of washer liquid to the nozzle 33 is stopped. As a result, washer fluid cannot be ejected from the nozzles 32, 33 until the wiper arm 9 rotationally moves from the position P (slightly forward of the turning position D) to a position D which is immediately forward of the turning position B. However, since there is a sufficient amount of washer fluid ejected immediately before on the windshield 7 during a time period in which the wiper arm 9 moves from the position P (slightly forward of the turning position B) to the turning position B, the windshield 7 can be sufficiently wiped with this washer fluid. When the wiper arm 9 reaches the position D immediately forward of the turning position B, communication is established between the changeover passage 25 and the valve opening 21a as shown in FIG. 12D, so that washer fluid is supplied to the nozzle 33. Even thereafter, the wiper arm 9 rotationally moves toward the turning position B. Thus, wetting as preparation of windshield wiping after moving direction turning is completed with washer fluid which has been ejected immediately before the turning in the direction of wiper arm movement after turned.

Consequently, when the wiper arm 9 rotationally moves counterclockwise from the turning position B in FIG. 15, the rotatable disc member 20 is also rotated counterclockwise from the state of FIG. 12D successively to the states of 12C, 12B and 12A in the order named. In this process, when the wiper arm 9 reaches a position (about 60 mm forward of the other turning position A) slightly forward of the other turning position A, the other end of the arcuate groove 22 is brought into contact with the engagement projection 18, so that rotation of the annular valve member 21 under friction is stopped. Thereafter, when the wiper arm 9 further rotationally moves toward the turning position A (the left side of the windshield 7), the rotatable disc member 20 is further rotated together with the wiper arm 9, so that communication between the changeover passage 25 and the valve opening 21a is interrupted thereby stopping the supply of washer liquid to the nozzle 33. Therefore, spraying of washer fluid from the nozzle 33 onto the windshield 7 is carried out until the wiper blade 9 reaches the position of about 60 mm forward of the turning position A so that the washer liquid reaches a part of the windhsield of about 30 mm forward of the turning position A. In this state, fluid communication between the changeover passage 24 and the valve opening 21a is interrupted, and therefore supply of the washer fluid to the nozzle 32 is stopped. As a result, washer fluid cannot be ejected from the nozzles 32, 33 until the wiper arm rotatably moves from the position immediately forward of position A to a position C (about 30 mm forward of the turning position A) immediately rearward of the turning position A. However, since there is a sufficient amount of washer fluid ejected immediately before on the windshield 7 during a time period in which the wiper arm 9 moves from the position slightly forward of the turning position A to the turning position A, the windshield 7 can be sufficiently wiped with this washer liquid. Accordingly, washer fluid can be prevented from scattering sideward of a vehicle over a front pillar located near the turning position A. When the wiper arm 9 reaches the position C immediately forward of the turning position A, fluid communication is established between the changeover passage 24 and the valve opening 21a as shown in FIG. 12A, so that washer fluid is supplied to the nozzle 32. Even thereafter, the wiper arm 9 rotatingly moves toward the turning position B. Thus, wetting as preparation of windshield wiping after moving direction turning is completed with washer fluid which is ejected o immediately before the turning in the direction of wiper arm movement upon being turned.

Thus, the nozzles 32, 33 are alternately brought into communication with the hose 19 to supply washer fluid from the washer pump to one of the nozzles 32, 33. Accordingly, the nozzles 32, 33 alternately eject and spray washer fluid onto the surface of the windshield 7 on the side of rotating or advancing direction of the wiper arm 9, so that the surface of the windshield 7 is wetted.

While the above-discussed first embodiment has been shown and described as being such arranged that spraying of washer fluid onto the windshield 7 is carried out to reach the position of about 30 mm forward of the turning position A, B of the wiper arm 9, it will be understood that the distance of the spray reaching position from the wiper arm turning position A, B is not limited to such a value (about 30 mm) so that the distance value may be other than about 30 mm. In this connection, the distance of the position at which washer fluid ejection is stopped, from the turning position in the wiper arm rotational direction may be larger or smaller than the value of 30 mm in a case where wiping of the windshield 7 can be sufficiently carried out with the washer fluid ejected immediately before and until the wiper arm 9 reaches the turning position A, B even upon stopping of washer fluid spraying while preventing washer liquid from scattering sideward of the vehicle when the wiper arm 9 reaches the turning position A.

FIGS. 17 to 22 illustrate a second embodiment of the vehicular windshield washer system according to the present invention, similar to the first embodiment with the exception that the pivot block 13 is formed at its top section peripheral portion with a cylindrical section 13d in place of the central cylindrical sections 13b, 13c of the first embodiment. In this embodiment, the cylindrical section 13d is coaxial with the pivot shaft 15 and fitted around a downwardly extending coaxial cylindrical section 20c of the rotatable disc member 20. The annular valve member 21 is disposed inside the rotatable disc member cylindrical section 20c. The upper end of the pivot block cylindrical section 13d comes into contact with the rotatable disc member 20. The annular valve member 21 is formed at its inner peripheral surface with two annular flange-like projections 21b, 21b which extend radially and inwardly and are coaxial with the pivot shaft 15 to form an inner groove (no numeral) therebetween. The annular valve member 21 is further formed at its outer periphreal surface with two annular flange-like projections 21c, 21c which extend radially and outwardly and are coaxial with pivot shaft 15 to form an outer groove (no numeral) therebetween. Two O-rings $O_4$, $O_5$ are respectively fitted in the inner and outer grooves of the annular valve member 21. The O-rings $O_4$, $O_5$ are in elastic contact with the peripheral surface pivot shaft 15 and the inner peripheral surface of the rotatable disc member cylindrical section 20c, respectively, thereby establishing a frictional engagement between the annular valve member 21 and the rotatable disc member 20 in addition to preventing fluid leak. Additionally, the rotatable disc member 20 is further formed with an upwardly projecting cylindrical section 20d having a cutout 20e for the nipples 26, 27 and the hoses 34, 35. The wiper arm 9 is provided at its base portion with a press-down projection 9b extending downwardly. Additionally, two opposite press-down projections 9c, 9c are formed on the wiper arm at positions slightly forward of the base section. The rotatable disc member 20 is pressed down by these projections 9b, 9c, 9c. Two O-rings $O_6$, $O_7$ having different diameters are disposed between the upper surface of the annular valve member 21 and the lower surface of the rotatable disc member 20. The O-rings $O_6$, $O_7$ are coaxial with the pivot shaft 15. The valve opening 21a is opened to the annular valve member upper surface between the O-rings $O_6$, $O_7$. It will be understood that this second embodiment is similar in operation and function to the first embodiment and therefore the detailed explanation thereof has been omitted upon assigning like reference numerals and characters to like elements and parts for the purpose of simplicity of illustration.

What is claimed is:

1. A vehicular windshield washer system in combination with a windshield wiper having a wiper arm, comprising:

first and second washer nozzles mounted on the wiper arm and so directed as to eject washer fluid to opposite sides of the wiper arm upon being supplied with washer fluid;

first means by which washer fluid from a washer flu source is selectively suppliable to said first and second washer nozzles in accordance with movement of the wiper arm, said first means including means by which washer fluid is suppliable to said first washer nozzle upon a first rotational movement of the wiper arm in a first direction and to said second washer nozzle upon a second rotational movement of the wiper arm in a second direction, said first and second rotational movement turning at a first position of the wiper arm;

second means by which washer fluid is suppliable to said first washer nozzle until the wiper arm reaches a second position spaced from said first position and stoppable to said first washer nozzle for a duration of rotational movement of the wiper arm from said second position to said first position;

a stationary member fixed to a vehicle body;

wherein said second means includes a disc member disposed coaxial with a pivot shaft and rotatable in accordance with the rotational movement of the wiper arm, said disc member being formed with a first fluid passage communicating with said first washer nozzle, an annular valve member disposed coaxial with said pivot shaft and slidably contacting with said disc member, said annular valve being formed with a valve opening communicating with said washer fluid source, said valve opening being agreeable with said first fluid passage of said disc member to establish fluid communication therebetween, means defining an arcuate groove in said annular valve member, said arcuate groove being coaxial with said pivot shaft, an engagement projection projected from said stationary member and inserted into said arcuate groove, said engagement projection stopping the rotation of said annular valve member upon coming into engagement with each of opposite ends of said arcuate groove, means for producing friction between said disc member and said annular valve member to allow said annular valve member to rotate with said disc member under said friction, and means for rotating said disc member in accordance with the rotational movement of the wiper arm.

2. A vehicular windshield washer system as claimed in claim 1, the wiper arm being fixedly mounted on pivot shaft so that the wiper arm is swingable in said first and second directions.

3. A vehicular windshield washer system as claimed in claim 1, wherein said second means includes means for causing said disc member first fluid passage and said annular valve member valve opening to agree with each other in a first range of the rotational movement of the wiper arm, said first range being outside a second range defined between said first and second position, means for so setting said arcuate groove that said engagement projection comes into engagement with each of the arcuate groove opposite ends to stop the rotation of said annular valve member when the wiper arm comes to said second position, and means for allowing said disc member to rotate even upon stopping of rotation of said annular valve member in said second range of the rotational movement of the wiper arm.

4. A vehicular windshield washer system as claimed in claim 3, wherein the wiper arm has an operational angle larger than an operational angle of said annular valve member, said wiper arm operational angle being defined between said first position at one extreme end and said first position at the other extreme end in swinging movement of the wiper arm, said annular valve member operational angle being defined between first and second positions of said engagement projection respectively at the opposite ends of said arcuate groove.

5. A vehicular windshield washer system as claimed in claim 4, wherein said wiper arm operational angle corresponds to a duration including said first and second ranges of the rotational movement of the wiper arm, and said annular valve member operational angle corresponds to a duration including said first range and other than said second range.

6. A vehicular windshield washer system as claimed in claim 1, wherein said second position is located forward of said first position in a direction in which the wiper arm moves.

7. A vehicular windshield washer system as claimed in claim 1, wherein the wiper arm moves in a direction from said second position to said first position.

8. A vehicular windshield washer system as claimed in claim 1, further comprising third means by which washer fluid is suppliable to said second washer nozzle since the wiper arm reaches a third position which is between said first and second positions.

9. A vehicular windshield washer system as claimed in claim 4, further comprising third means by which washer fluid is suppliable to said second washer nozzle since the wiper arm reaches a third position which is between said first and second positions, said third means including means for defining a second fluid passage in said disc member, said second fluid passage communicating with said second washer nozzle and being agreeable with said valve opening of said annular valve to establish fluid communication therebetween, means for causing said second fluid passage and said annular valve member valve opening to agree with each other within a third range of the rotational movement of the wiper arm, said third range being within said second range and located between said first and third position.

* * * * *